(12) United States Patent
Singh

(10) Patent No.: US 12,039,217 B2
(45) Date of Patent: Jul. 16, 2024

(54) SMART GLASS INTERFACE TO MOBILE USER

(71) Applicant: Bank of America Corporation, Charlotte, NC (US)

(72) Inventor: Shailendra Singh, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 121 days.

(21) Appl. No.: 17/460,485

(22) Filed: Aug. 30, 2021

(65) Prior Publication Data
US 2023/0076953 A1    Mar. 9, 2023

(51) Int. Cl.
| | |
|---|---|
| G06F 3/14 | (2006.01) |
| G06F 9/451 | (2018.01) |
| G06Q 50/00 | (2024.01) |
| H04L 51/046 | (2022.01) |
| H04L 67/141 | (2022.01) |
| G06Q 20/32 | (2012.01) |
| G06Q 20/38 | (2012.01) |
| G06Q 20/40 | (2012.01) |
| G06Q 40/02 | (2023.01) |

(52) U.S. Cl.
CPC ............ *G06F 3/1454* (2013.01); *G06F 9/452* (2018.02); *G06Q 50/01* (2013.01); *H04L 51/046* (2013.01); *H04L 67/141* (2013.01); *G06Q 20/321* (2020.05); *G06Q 20/3223* (2013.01); *G06Q 20/386* (2020.05); *G06Q 20/4016* (2013.01); *G06Q 40/02* (2013.01)

(58) Field of Classification Search
CPC ....... G06F 3/1454; G06F 9/452; G06Q 50/01; G06Q 20/321; G06Q 20/3223; G06Q 20/386; G06Q 20/4016; G06Q 40/02; H04L 51/046; H04L 67/141
See application file for complete search history.

(56) References Cited

U.S. PATENT DOCUMENTS

| | | | |
|---|---|---|---|
| 8,407,603 B2 * | 3/2013 | Christie | G06Q 10/107 715/752 |
| 2009/0177981 A1 * | 7/2009 | Christie | H04L 12/1831 715/758 |
| 2012/0212499 A1 * | 8/2012 | Haddick | G02B 27/0093 345/589 |
| 2012/0249741 A1 * | 10/2012 | Maciocci | G06T 19/006 348/51 |

(Continued)

*Primary Examiner* — David D Davis
(74) *Attorney, Agent, or Firm* — Weiss & Arons LLP

(57) ABSTRACT

A system for communicating with eye wear. The system may include smart glass pairing instructions that are configured to establish a radio frequency ("RF") communication link between a terminal and the eye wear. The system may include image proximity instructions that are configured to estimate a distance from the eye wear to the terminal. The system may include overlay instructions that are configured to overlay an eye wear display on a view of the terminal through the eye wear. The system may include response instructions configured to receive from a user a response to the eye wear display. The system may include synchronization instructions configured to: define a virtual integrated UI that corresponds to the terminal and the eye wear display; and record a state of the virtual integrated UI.

15 Claims, 6 Drawing Sheets

(56) References Cited

U.S. PATENT DOCUMENTS

| | | | |
|---|---|---|---|
| 2015/0379963 A1* | 12/2015 | Holmanu | G06F 3/1454 |
| | | | 345/173 |
| 2016/0134336 A1* | 5/2016 | Persson | G01S 3/14 |
| | | | 455/456.1 |
| 2016/0284125 A1* | 9/2016 | Bostick | G06F 3/012 |
| 2018/0173323 A1* | 6/2018 | Harvey | G06F 3/011 |
| 2019/0114802 A1* | 4/2019 | Lazarow | H04W 56/001 |
| 2023/0039659 A1* | 2/2023 | Bryant | G06F 3/04815 |
| 2023/0065719 A1* | 3/2023 | Bryant | H04L 67/51 |

\* cited by examiner

SMART GLASS INTERFACE TO MOBILE USER

BACKGROUND

Enterprises in the customer service industry typically provide a user with a mobile application ("app") to perform operations involving the customer's information on a customer service platform. Most banking apps have limited functionality for interacting with the platform to perform operations, exchange information, obtain services, and other such. To provide additional services, augmented app functionality is desirable. The additional functionality, however, may be beneficial to only some of the users.

It would therefore be desirable to provide augmented and configurable smart-glass-based functionality to the mobile application.

SUMMARY

Apparatus and methods for communicating with eye wear are, therefore, provided. The eye wear may communicate with a terminal. The terminal may include a mobile terminal. The eye wear may communicate with an enterprise information system. The mobile terminal may communicate with an enterprise information system. A user of the eye wear may exchange information with the enterprise information system based on a virtual interface displayed on the eye wear. The enterprise information system may provide information to the user. The enterprise may provide service to the user. The user may provide service to the enterprise.

The apparatus may include an intelligent smart glass eye wear item that is configured to overlay a virtual interface on a mobile terminal screen. The overlay may provide enhanced functionality. A user may select the functionality. The overlain user interface may be rendered as a layer "on top of" a mobile terminal user interface. The user may select various additional functionalities from an enterprise app store or other platform. The user may drag an item from the mobile terminal interface to the overlay interface. The user may drag an item from the overlay interface to the mobile terminal interface. The dragging may be performed in a synchronous manner. This means that neither the functionality nor state (other than a state variable corresponding to the location of the item in the interfaces) of the item does not change as a result of the dragging.

BRIEF DESCRIPTIONS OF THE DRAWINGS

The objects and advantages of the invention will be apparent upon consideration of the following detailed description, taken in conjunction with the accompanying drawings, in which like reference characters refer to like parts throughout, and in which.

Figure 1:
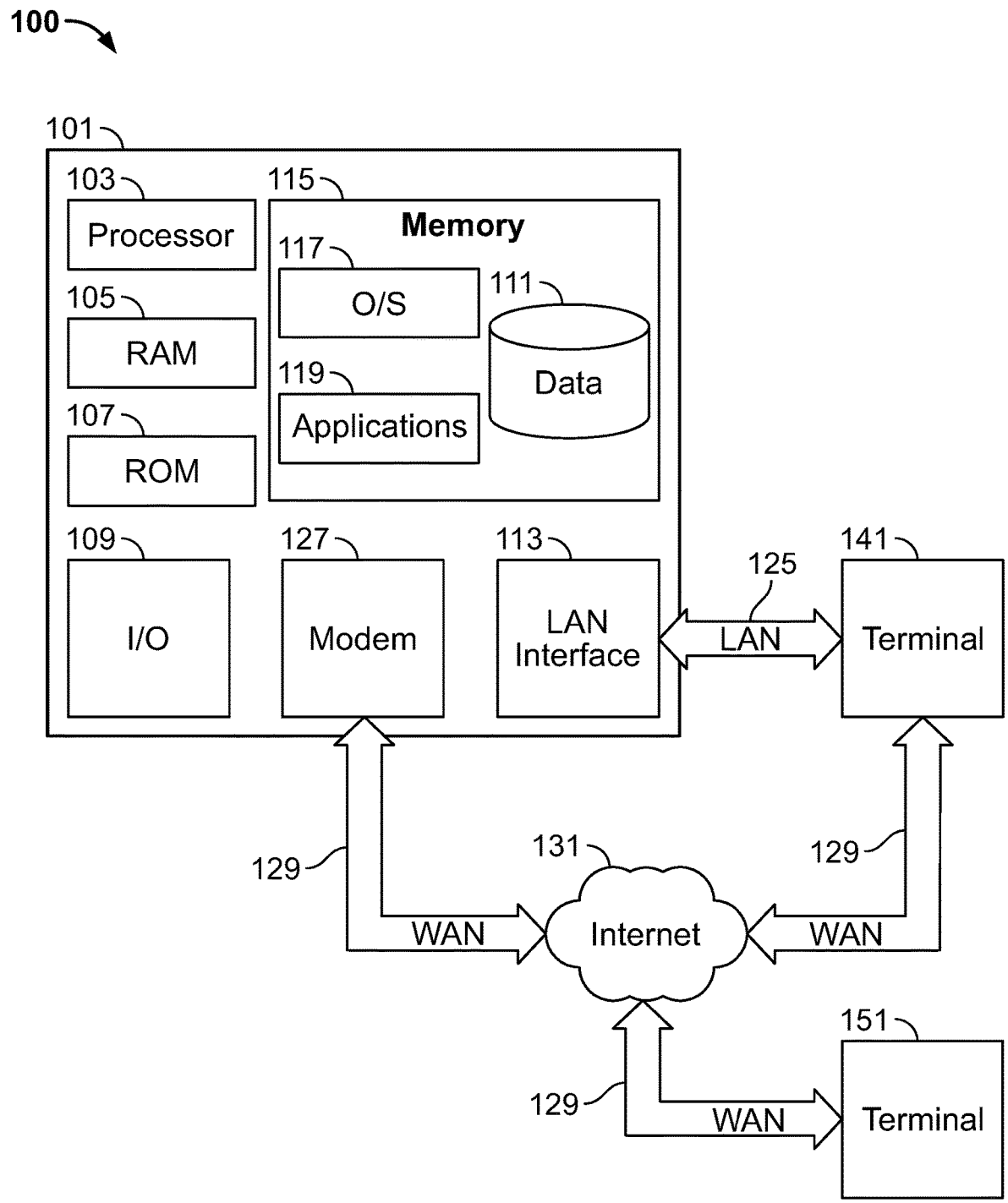
FIG. 1 shows illustrative apparatus in accordance with principles of the invention.

The leftmost digit (e.g., "L") of a three-digit reference numeral (e.g., "LRR"), and the two leftmost digits (e.g., "LL") of a four-digit reference numeral (e.g., "LLRR"), generally identify the first figure in which a part is called-out.

DETAILED DESCRIPTION

Apparatus and methods for communicating with eye wear are provided. The eye wear may communicate with a terminal. The terminal may include a mobile terminal. The eye wear may communicate with an enterprise information system. The mobile terminal may communicate with an enterprise information system. A user of the eye wear may exchange information with the enterprise information system based on a virtual interface displayed on the eye wear. The enterprise information system may provide information to the user. The enterprise may provide service to the user. The user may provide service to the enterprise.

The apparatus may include an intelligent smart glass eye wear item that is configured to overlay a virtual interface on a mobile terminal screen. The overlay may provide enhanced functionality. A user may select the functionality. The overlain user interface may be rendered as a layer "on top of" a mobile terminal user interface. The mobile terminal user interface may be provided by the enterprise. The mobile terminal user interface may be provided by a third party. The enterprise may provide an API so that a third party can develop an overlay that will interact with the enterprise's mobile terminal user interface. The enterprise may provide the overlay interface as an add-on to the mobile terminal app. The user may select various additional functionalities from an enterprise app store or other platform. The user may drag an item from the mobile terminal interface to the overlay interface. The user may drag an item from the overlay interface to the mobile terminal interface. The dragging may be performed in a synchronous manner. This means that neither the functionality nor state (other than a state variable corresponding to the location of the item in the interfaces) of the item does not change as a result of the dragging.

The methods may include pairing of multiple glasses in a secure local network that can be used as medium to share an alert message. The alert message may include, e.g., a fraud alert, a news alert, a weather alert, etc. The messaging may be based on a user subscription.

Table 1 lists illustrative apparatus elements.

TABLE 1

| Illustrative apparatus elements |
|---|
| Smart glass pairing module |
| Image proximity engine |
| Dynamic user interface ("UI") overlaying module |
| Virtual UI configuration module |
| Virtual interface response module |
| Synchronous rendering and functionality transfer module |
| Glass-glass pairing module |
| Local glass pairing network module |
| Smart glass enterprise platform |
| Other suitable apparatus elements |

Table 2 lists illustrative apparatus features.

TABLE 2

Illustrative apparatus features

Real-time dynamic integration of mobile enterprise application user interface with smart glass overlay virtual user interface ("UI")
Real time seamless rendering of additional functionality on smart glass overlay virtual user interface based on proximity sensing engine
Interactive smart glass overlay virtual user interface where user can perform additional enterprise activities and subscribe additional services
Two-way synchronous rendering and functionality widgets transferable between mobile app user interface and smart glass virtual add on interface
Enhancing user capability to configure functionality based on need and choice
Local glass pairing network to share alerts, events, news technology user
Smart glass
Mobile application
IoT 5g-edge computing
Other suitable features Table 3 lists illustrative terminals. A terminal may be a terminal that is not a mobile terminal.

TABLE 3

Illustrative terminals

Mobile telephone
Computer display
Automatic transaction machine ("ATM")
Tablet computer
Laptop computer
Digital media player
Point of sale ("POS") device
Other suitable terminals The apparatus and methods may include a system for communicating with eye wear.

The system may include smart glass pairing instructions that are configured to establish a radio frequency ("RF") communication link between a terminal and the eye wear. The system may include image proximity instructions that are configured to estimate a distance from the eye wear to the terminal. The system may include overlay instructions that are configured to overlay an eye wear display on a view of the terminal through the eye wear. The system may include response instructions configured to receive from a user a response to the eye wear display. The system may include synchronization instructions configured to: define a virtual integrated UI that corresponds to the terminal and the eye wear display; and record a state of the virtual integrated UI.

The eye wear may be first eye wear. The link may be a first link. The system may include peer pairing instructions for establishing an RF communication link between the first eye wear and second eye wear. The system may include a profile identifying conditions for sharing information between the first eye wear and the second eye wear.

The state may include a program identifier. The state may include a spatial location, in the virtual integrated UI, of an indication of the program. The program may include a folder. The system may include an app. The system may include a widget.

The virtual integrated UI may register a boundary of the terminal. The synchronization instructions may be configured to: track a position of the indication; and communicate to the terminal a boundary-crossing when the position moves from one side of the boundary to the other.

The overlay instructions may be configured to change the eye wear display in response to a change of the distance.

The methods may include a method for expanding terminal functionality. The methods may include providing to eye wear smart glass pairing instructions that are configured to establish a radio frequency ("RF") communication link between a terminal and the eye wear. The methods may include providing to eye wear image proximity instructions that are configured to estimate a distance from the eye wear to the terminal. The methods may include providing to eye wear overlay instructions that are configured to overlay an eye wear display on a view of the terminal through the eye wear. The methods may include providing to eye wear response instructions configured to receive from a user a response to the eye wear display. The methods may include providing to eye wear synchronization instructions configured to: define a virtual integrated UI that corresponds to terminal and the eye wear display; and record a state of the virtual integrated UI. The methods may include providing to eye wear, when the eye wear is first eye wear and the link is a first link, peer pairing instructions for establishing an RF communication link between the first eye wear and second eye wear. The methods may include providing to eye wear, when the eye wear is first eye wear and the link is a first link, a profile identifying conditions for sharing information between the first eye wear and the second eye wear.

The methods may include receiving from the eye wear a request for a program. The methods may include providing to the eye wear the program. The program may include an app. The app may include a group chat for a group that includes the eye wear and a plurality of other eye wear. The program may include a widget.

The method may include updating a configuration profile corresponding to the eye wear. The method may include transmitting the configuration profile to the terminal. The virtual integrated UI registers a boundary of the terminal. The synchronization instructions may be configured to: track a spatial location, in the virtual integrated UI, of an indication of a program; and communicate to the terminal a boundary-crossing when the location moves from one side of the boundary to the other.

The methods may include providing to a terminal image proximity instructions that are configured to estimate a distance from eye wear to the terminal. The methods may include providing to a terminal synchronization instructions configured to: track a virtual integrated UI that corresponds to the terminal and the eye wear display; and record a state of the virtual integrated UI. The synchronization instructions may be configured to receive a virtual integrated UI map that is defined by the eye wear.

The methods may include providing to a terminal a configuration file corresponding to the eye wear and a program on the eye wear.

The methods may include providing to a terminal a message that is: addressed to the eye wear; displayable on the eye wear display; and configured to be not displayable on the terminal. The message may include a unicast message. The message may include a multicast message. The method may include receiving from the terminal a user request to send the message "FOR USER'S EYES ONLY".

FIG. 1 is a block diagram that illustrates a computing server 101 (alternatively referred to herein as a "server or computer") that may be used in accordance with the principles of the invention. The server 101 may have a processor 103 for controlling overall operation of the server and its associated components, including RAM 105, ROM 107, input/output ("I/O") module 109, and memory 115.

I/O module 109 may include a microphone, keypad, touchscreen and/or stylus through which a user of server 101 may provide input, and may also include one or both of a speaker for providing audio output and a video display device for providing textual, audiovisual and/or graphical output. Software may be stored within memory 115 and/or other storage (not shown) to provide instructions to processor 103 for enabling server 101 to perform various functions. For example, memory 115 may store software used by server 101, such as an operating system 117, application programs 119, and an associated database 111. Alternatively, some or all of computer executable instructions of server 101 may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks.

When used in a LAN networking environment, server 101 is connected to LAN 125 through a network interface or adapter 113.

When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Additionally, application program 119, which may be used by server 101, may include computer executable instructions for invoking user functionality related to communication, such as email, short message service (SMS), and voice input and speech recognition applications.

Computing server 101 and/or terminals 141 or 151 may also be mobile terminals including various other components, such as a battery, speaker, and antennas (not shown). Terminal 151 and/or terminal 141 may be portable devices such as a laptop, tablet, smartphone or any other suitable device for receiving, storing, transmitting and/or displaying relevant information.

Any information described above in connection with database 111, and any other suitable information, may be stored in memory 115. One or more of applications 119 may include one or more algorithms that may be used to perform the functions of one or more apparatus element and perform any other suitable tasks.

The apparatus and methods may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The apparatus and methods may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
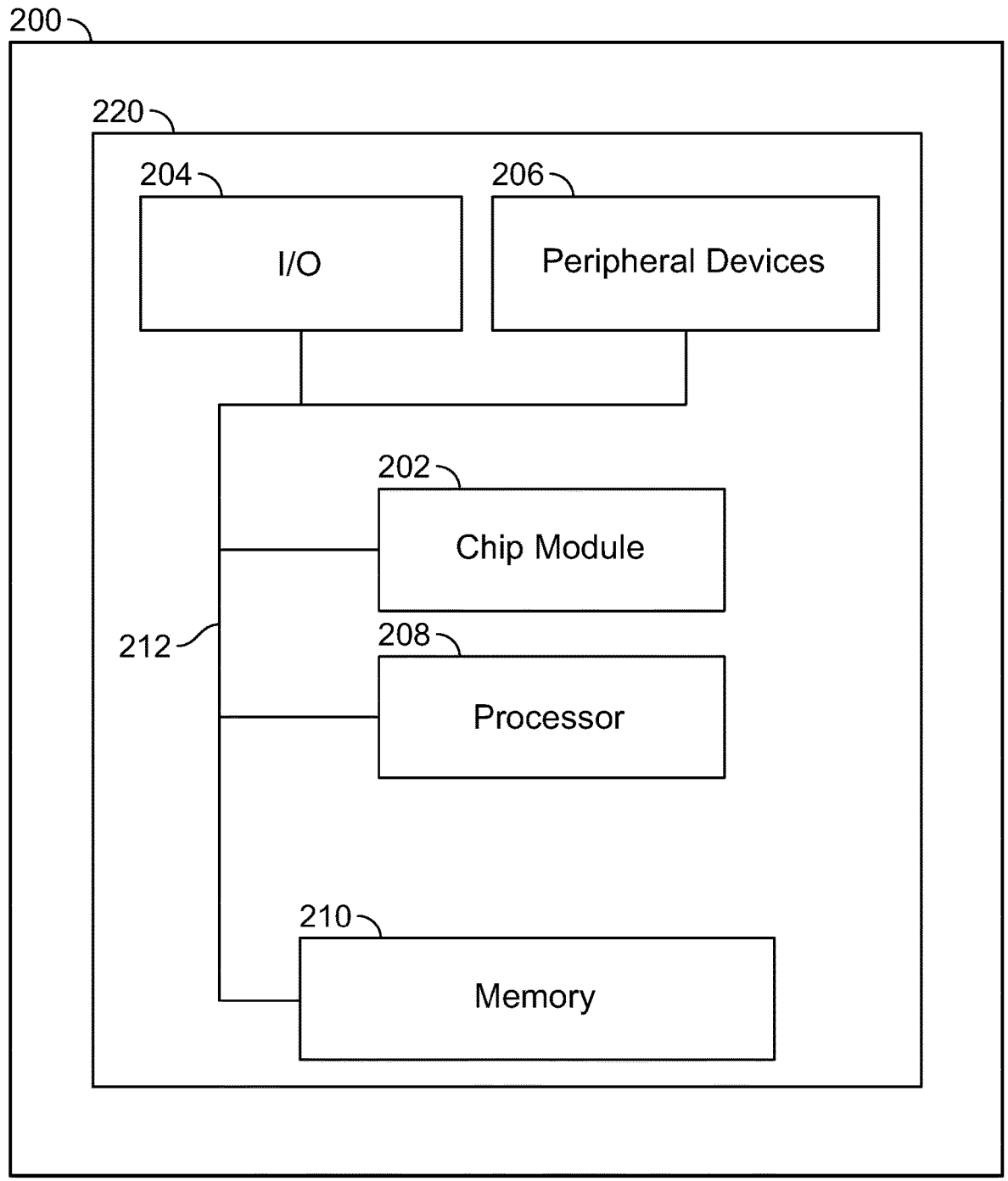
FIG. 2 shows illustrative apparatus in accordance with principles of the invention.

FIG. 2 shows illustrative apparatus 200 that may be configured in accordance with the principles of the invention.

Apparatus 200 may be a computing machine. Apparatus 200 may include one or more features of the apparatus that is shown in FIG. 1.

Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may solve equations and perform other methods described herein; and machine-readable memory 210.

Machine-readable memory 210 may be configured to store in machine-readable data structures associated with an apparatus feature and any other suitable information or data structures.

Components 202, 204, 206, 208 and 210 may be coupled together by a system bus or other interconnections 212 and may be present on one or more circuit boards such as 220. In some embodiments, the components may be integrated into a single chip.

The chip may be silicon-based.

Figure 3:
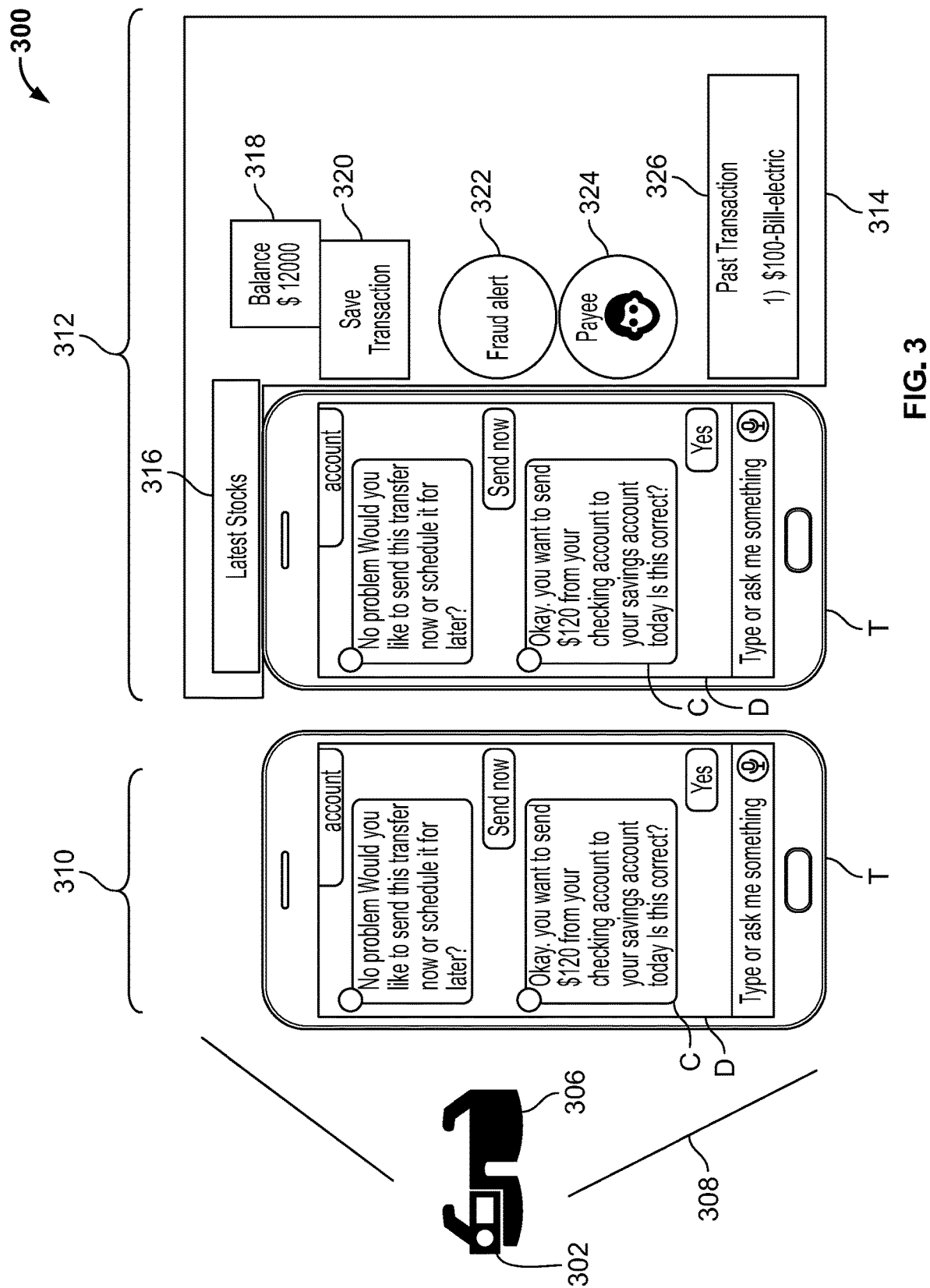
FIG. 3 shows an illustrative schema in accordance with principles of the invention.

FIG. 3 shows illustrative functionality 300 of a system for communicating with eye wear. The functionality may involve eye wear 302. Eye wear 302 may include optical glasses. The optical glasses may be smart glasses. Eye wear 302 may include wearable frame 304. Eye wear 302 may include one or more smart glass display such as smart glass display 306.

Functionality 300 may include view 308. View 308 may be a view through smart glass display 306. View 308 may include terminal layer 310. View 308 may include terminal layer 312. Layer 310 may include terminal T, display D of terminal T, and, on display D, chat text C. Layer 312 may include terminal T, display D of terminal T, and, on display D, chat text C. View 312 may include overlay 314. Overlay 314 may include one or more views, such as views 314, 316, 318, 320 and 324, of information from corresponding programs. The programs may run on eye wear 302. The programs may run on terminal T. The programs may run on a remote server.

View 308 may include both terminal T and overlay 314.

Figure 4:
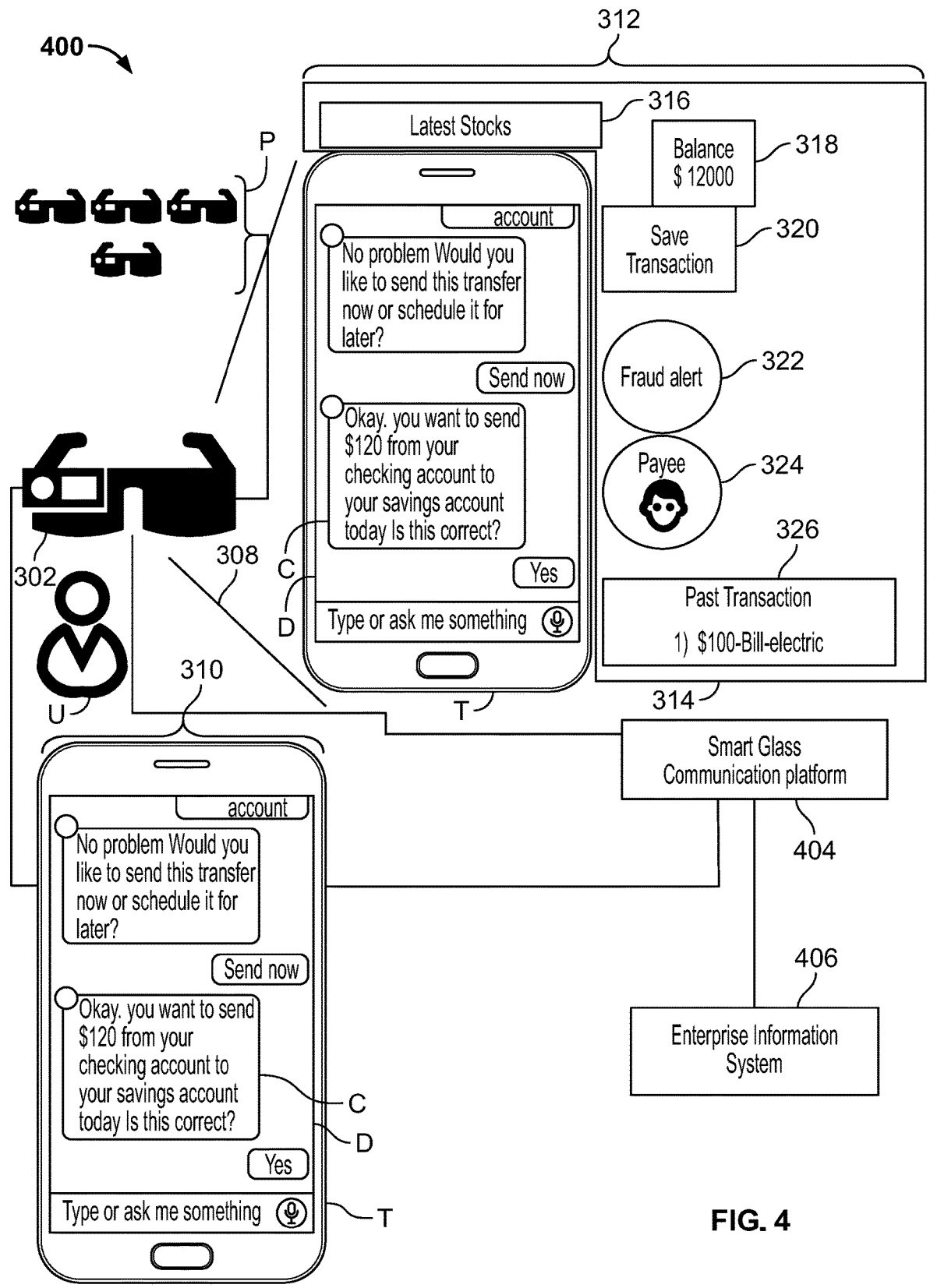
FIG. 4 shows an illustrative schema in accordance with principles of the invention.

FIG. 4 shows illustrative architecture 400 for communicating with eye wear. Architecture 400 may include eye wear 302. Architecture 400 may include smart glass communication platform 404. Architecture 400 may include enterprise information system 406. Architecture 400 may include peer eye wear units P. User U may wear eye wear 302. User U may be in possession of terminal T. User U may view terminal T via view 308. View 308 may include layers 310 and 312.

Smart glass communication platform may provide programs, such as those corresponding to views 316, 318, 320, 324 and 326, to terminal T. Smart glass communication platform may provide programs, such as those corresponding to views 316, 318, 320, 324 and 326, to terminal eye wear 302. One or more of the programs may be resident on terminal T. One or more of the programs may be resident on eye wear 302.

Smart glass communication platform may provide instructions to terminal T. Smart glass communication platform may provide instructions to eye wear 302. One or more of the instructions may be resident on terminal T. One or more of the instructions may be resident on eye wear 302.

The instructions may configure eye wear 302 to establish a radio frequency ("RF") communication link with terminal T. The instruction may configure eye wear 302 to use native smart glass features to estimate a distance from eye wear 302 to terminal T. The instructions may configure eye wear 302 to overlay layer 312 on layer 310 in view 308. The instructions may configure eye wear 302 to scale layer 312 based on the distance. The instructions may configure eye wear 302 to acquire a response by user U to information in view 308. The response may include a user U gesture. The gesture may include a vocal utterance. The instructions may configure eye wear 302 to define a virtual integrated UI corresponding to view 308. The instructions may configure eye wear 302 to record a state of the virtual integrated UI. The instructions may configure eye wear 302 to establish an RF communication link with one or more of peer eye wear units P. Peer eye wear units P, along with eye wear 302, may communicate with each other and process information in an edge computing environment. The environment may include features of a local pairing network. The edge computing environment may include intermediate communication devices such as terminal T or terminals corresponding to units P. The instructions may configure eye wear 302 to establish a profile identifying conditions for sharing information with one or more of peer eye wear units P. The instructions may configure eye wear 302 to update the profile.

Platform 404 may interact with enterprise information system 406 to transmit requests for information, information, security data, and the like, between user U and enterprise information system 406.

Figure 5:
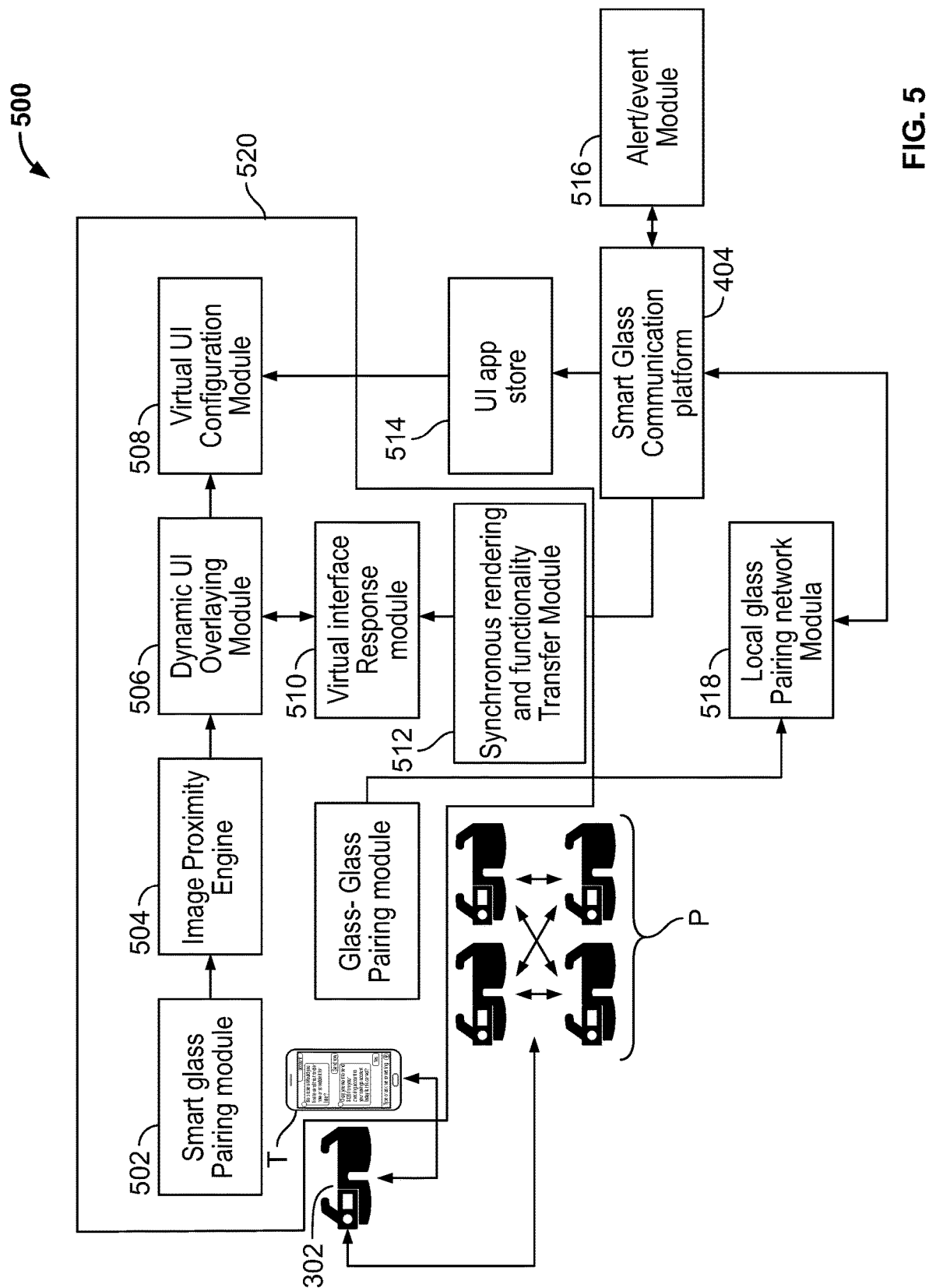
FIG. 5 shows an illustrative schema in accordance with principles of the invention.

FIG. 5 shows illustrative system 500 for communicating with eye wear. System 500 may include smart glass pairing module 502. System 500 may include image proximity engine 504. System 500 may include dynamic UI overlaying module 506. System 500 may include virtual UI configuration module 508. System 500 may include virtual interface response module 510. System 500 may include synchronous rendering and functionality transfer module 512. System 500 may include UI app store 514. System 500 may include alert/event module 516. System 500 may include local glass pairing network module 518.

Smart glass pairing module 502 may provide a communication link between eye wear 302 and terminal T. Proximity engine 504 may provide to UI overlaying module 506 a distance between eye wear 302 and terminal T. The distance may change as user U adjusts a distance between user U's head and terminal T, which user U may hold in user U's hand. UI overlaying module 506 may use the distance to maintain a spatial relationship between overlay 314 and the view of terminal T in layer 310. UI overlaying module 506 may use the distance to maintain size proportionality between overlay 314 and the view of terminal T in layer 310.

Dynamic UI overlaying module 506 may define a user interface based on layer 312. Module 506 may provide for interaction between user U and programs, such as those corresponding to views 316, 318, 320, 324 and 326. Module 506 may enable user U to rearrange views such as 316, 318, 320, 324 and 326. Virtual UI configuration module 508 may configure the interface to be compatible with the hardware or firmware of eye wear 302. Virtual UI configuration module 508 may configure the interface to be compatible with the hardware or firmware of terminal T. Virtual interface response module 510 may enable eye wear 302 to acquire information from user U via gesture, voice or any other suitable expression by user U. Synchronous rendering and functionality transfer module 512 may enable user U to move views such as views 316, 318, 320, 324 and 326 back and forth between display D and overlay 314. User U may move a view using a gesture, voice or any other suitable expression. Module 512 may capture program status information and virtual UI state information. Module 512 may use the status information and the state information to maintain status of a program when user U moves a program view from display D to overlay 314 or vice-versa. UI app store 514 may hold programs. User U may retrieve programs from UI app store 514. The programs may be compatible with eye wear 302. The programs may be compatible with terminal T. Alert/event module 516 may be configured to share an alert between units P or between one of units P and eye wear 302. A user of units P, user U of eye wear 302, may initiate a fraud alert. The fraud alert may be transmitted to the other units. The fraud alert may be multicast to the other units. Alert/event module 516 may provide a program by which a user may initiate the alert. The program may be configured to sense a fraud condition based on a message received at a terminal such as T, and automatically forward the alert to the other units. Module 516 may be configured to treat a predefined event in the same way it treats alerts. Local glass pairing network module 518 may provide units P and eye wear 302 with pairing code.

System 500 may include constellation 520 of functional modules. User U may download constellation 520 onto terminal T from UI app store 514.

Figure 6:
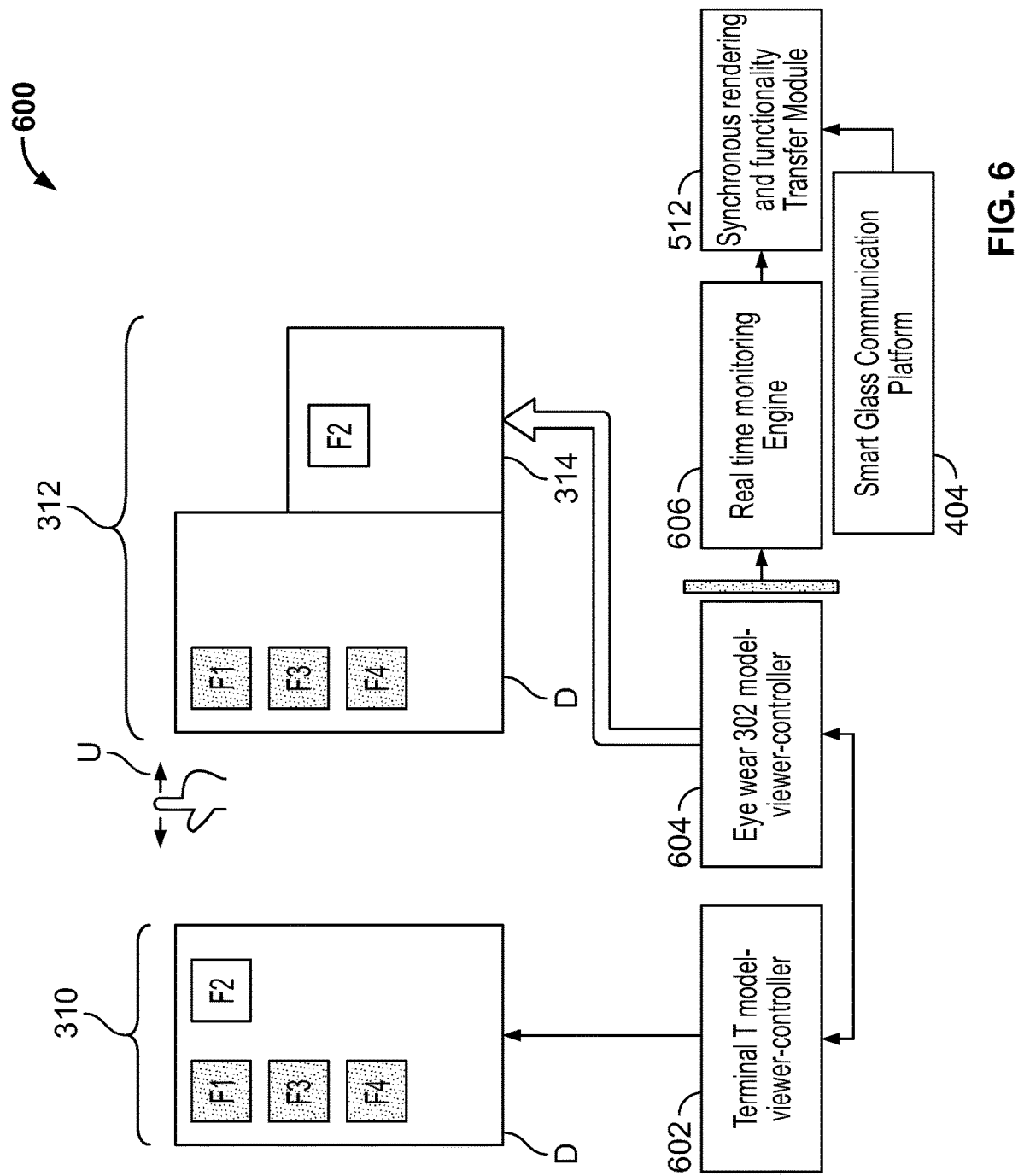
FIG. 6 shows an illustrative schema in accordance with principles of the invention.

FIG. 6 shows illustrative architecture 600 for communicating with eye wear.

Architecture 600 may include layer 310. Architecture 600 may include layer 312. Architecture 600 may include smart glass communication platform 404. Architecture 600 may include synchronous rendering and functionality transfer module 512. Architecture 600 may include terminal T model-viewer-controller 602. Architecture 600 may include eye wear 302 model-viewer-controller 604. Architecture 600 may include real time monitoring engine 606.

Function widgets may be resident in terminal T. Function widgets may be resident in eye wear 302. Icons such as F1, F2, F3 and F4, each corresponding to a function widget, may be displayed in display D. User U (via swipe, shown), may move an icon such as F2 from display D to overlay 314, and vice-versa.

Terminal T model-viewer controller 602 may control the arrangement of icons on display D. Terminal T model-viewer controller 602 may reconfigure the icons on display D in response to an expression of user U, such as a swipe. Terminal T model-viewer controller 602 may have one or more features in common with constellation 520. Eye wear 302 model-viewer-controller 604 may control the arrangement of icons in overlay 314. Eye wear 302 model-viewercontroller 604 may reconfigure the icons in overlay 314 in response to an expression of user U, such as a gesture. Eye wear 302 model-viewer-controller 604 may have one or more features in common with constellation 520.

Real time monitoring engine 606 may receive status or state information from terminal T model-viewer controller 602. Real time monitoring engine 606 may receive status or state information from eye wear 302 model-viewer-controller 604. Real time monitoring engine 606 may integrate and configure the status and state information, and feed the status and state information to synchronous rendering and functionality transfer module 512. Synchronous rendering and functionality transfer module 512 may be in communication with platform 404. Platform 404 may communicate data, information, and requests between user U and enterprise information system 406.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative process may include steps shown in connection with another illustrative process.

Thus, methods and apparatus for communicating with eye wear have been provided. Persons skilled in the art will appreciate that the present invention may be practiced by other than the described embodiments, which are presented for purposes of illustration rather than of limitation.

What is claimed is:

1. A system for communicating with a first eye wear, the system comprising:
smart glass pairing instructions that are configured to establish a radio frequency ("RF") communication link between a terminal and the first eye wear;
image proximity instructions that are configured to estimate a distance from the first eye wear to the terminal;
overlay instructions that are configured to overlay an eye wear display comprising an icon, corresponding to a function widget on a view of the terminal through the first eye wear;
response instructions configured to receive from a user a response to the eye wear display, the response including a vocal utterance;
synchronization instructions configured to:
define a virtual integrated user interface ("UI") that corresponds to the terminal and the eye wear display; and
record a state of the virtual integrated UI;
peer pairing instructions for establishing a second RF communication link between the first eye wear and second eye wear in a secure local network configured to share a fraud alert message; and
a profile identifying conditions for sharing information between the first eye wear and the second eye wear;
wherein the virtual integrated UI is configured to combine synchronous rendering and functionality of the eye wear display with a user interface of the terminal, the synchronous rendering and functionality making the icon transferable from the user interface of the terminal and the eye wear display via a swipe by the user.

2. The system of claim 1 wherein the state includes:
a program identifier; and
a spatial location, in the virtual integrated UI, of an indication of the program.

3. The system of claim 2 wherein the program includes a folder.

4. The system of claim 2 wherein the program includes an app.

5. The system of claim 2 wherein the program includes a widget.

6. The system of claim 2 wherein:
the virtual integrated UI registers a boundary of the terminal;
the synchronization instructions are configured to:
track a position of the indication; and
communicate to the terminal a boundary-crossing when the position moves from one side of the boundary to the other.

7. The system of claim 1 wherein the overlay instructions are further configured to change the eye wear display in response to a change of the distance.

8. A method for expanding terminal functionality, the method comprising providing to a first eye wear:
smart glass pairing instructions that are configured to establish a radio frequency ("RF") communication link between a terminal and the first eye wear;
image proximity instructions that are configured to estimate a distance from the first eye wear to the terminal;
overlay instructions that are configured to overlay an eye wear display including icons, corresponding to a function widget, on a view of the terminal through the first eye wear;
response instructions configured to receive from a user a response to the eye wear display, the response including a gesture, the response inducing the first eye wear to reconfigure the icons;
synchronization instructions configured to:
define a virtual integrated user interface ("UI") that corresponds to terminal and the eye wear display; and
record a state of the virtual integrated UI;
establish a second RF communication link via peer pairing instructions between the first eye wear and second eye wear in a secure local network configured to share a fraud alert message; and
identify profile conditions for sharing information between the first eye wear and the second eye wear;
wherein the virtual integrated UI is configured to combine synchronous rendering and functionality of the eye wear display with a user interface of the terminal, the synchronous rendering and functionality making the icons transferable between the user interface of the terminal and the eye wear display via a swipe by the user.

9. The method of claim 8 further comprising:
receiving from the eye wear a request for a program; and
providing to the eye wear the program.

10. The method of claim 9 wherein the program includes an app.

11. The method of claim 10 wherein the app includes a group chat for a group that includes the eye wear and a plurality of other eye wear.

12. The method of claim 9 wherein the program includes a widget.

13. The method of claim 8 further comprising updating a configuration profile corresponding to the eye wear.

14. The method of claim 13 further comprising transmitting the configuration profile to the terminal.

15. The method of claim 8 wherein:
- the virtual integrated UI registers a boundary of the terminal;
- the synchronization instructions are configured to:
- track a spatial location, in the virtual integrated UI, of an indication of a program; and
- communicate to the terminal a boundary-crossing when the location moves from one side of the boundary to the other.

\* \* \* \* \*